(12) United States Patent
Yi et al.

(10) Patent No.: US 11,602,966 B2
(45) Date of Patent: Mar. 14, 2023

(54) INDEPENDENT LINEAR SUSPENSION SYSTEM

(71) Applicant: CNH Industrial America LLC, New Holland, PA (US)

(72) Inventors: Thomas T. Yi, Roselle, IL (US); Michael Jensen, Lockport, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 17/358,802

(22) Filed: Jun. 25, 2021

(65) Prior Publication Data
US 2022/0001710 A1     Jan. 6, 2022

Related U.S. Application Data

(60) Provisional application No. 63/047,343, filed on Jul. 2, 2020.

(51) Int. Cl.
*B60G 3/26*     (2006.01)

(52) U.S. Cl.
CPC .......... *B60G 3/26* (2013.01); *B60G 2204/129* (2013.01); *B60G 2204/148* (2013.01); *B60G 2206/50* (2013.01); *B60G 2300/082* (2013.01)

(58) Field of Classification Search
CPC ...... B60G 3/26; B60G 3/01; B60G 2204/129; B60G 2204/148; B60G 2206/50;
(Continued)

(56) References Cited

U.S. PATENT DOCUMENTS

| 910,491 | A | * | 1/1909 | Bonnevie | B60G 3/01 |
|---|---|---|---|---|---|
| | | | | | 180/9.54 |
| 1,002,470 | A | * | 9/1911 | Sword | B60G 3/01 |
| | | | | | 280/124.127 |

(Continued)

FOREIGN PATENT DOCUMENTS

| BE | 384043 A | * 11/1931 |
|---|---|---|
| DE | 10145304 A1 | 4/2003 |

(Continued)

OTHER PUBLICATIONS

Dubois, suspension device for vehicles with independent wheels, Nov. 17, 1931, EPO, BE-384043-A, Machine Translation of Description (Year: 1931).*

*Primary Examiner* — Paul N Dickson
*Assistant Examiner* — Matthew D Lee
(74) *Attorney, Agent, or Firm* — Rickard DeMille; Rebecca Henkel

(57) ABSTRACT

A work vehicle includes a chassis. An independent linear suspension system couples to the chassis. The independent linear suspension system includes a driveshaft that couples to the chassis and to a transmission. A wheel hub couples to the driveshaft and rotates a wheel in response to rotation of the driveshaft. A spindle couples to the wheel hub. A spindle carrier couples to the spindle. The spindle carrier defines a first aperture and a second aperture. A first pin extends through the first aperture. A second pin extends through the second aperture. The first pin and the second pin block rotation of the spindle carrier. The spindle carrier moves linearly along the first pin and the second pin.

18 Claims, 6 Drawing Sheets

(58) Field of Classification Search
CPC .......... B60G 2300/082; B60G 2200/44; B60G 2204/423; B60G 2204/4232
See application file for complete search history.

(56) References Cited

U.S. PATENT DOCUMENTS

| | | | | |
|---|---|---|---|---|
| 2,114,937 | A * | 4/1938 | Poirier | B60G 3/01 |
| | | | | 267/289 |
| 5,931,486 | A | 8/1999 | Andreis | |
| 7,413,201 | B2 | 8/2008 | Freytag et al. | |
| 7,644,942 | B2 | 1/2010 | Bordini et al. | |
| 2010/0044980 | A1* | 2/2010 | Kremmin | B60G 3/01 |
| | | | | 280/6.156 |
| 2011/0148066 | A1* | 6/2011 | Beaujon | B60G 15/06 |
| | | | | 267/195 |
| 2012/0241230 | A1* | 9/2012 | Vidal | B60G 3/01 |
| | | | | 180/58 |
| 2015/0102593 | A1* | 4/2015 | Slawson | A01M 7/0082 |
| | | | | 280/830 |

FOREIGN PATENT DOCUMENTS

| | | | | |
|---|---|---|---|---|
| DE | 102008040505 | A1 * | 1/2010 | ............... B60G 3/01 |
| DE | 102010022313 | A1 * | 12/2011 | ............. B60G 11/30 |
| FR | 2926492 | A1 * | 7/2009 | ......... B60G 17/0152 |

\* cited by examiner

INDEPENDENT LINEAR SUSPENSION SYSTEM

CROSS-REFERENCE TO RELATED APPLICATION

This application claims priority from and the benefit of U.S. Provisional Application Ser. No. 63/047,343, entitled "INDEPENDENT LINEAR SUSPENSION SYSTEM", filed Jul. 2, 2020, which is hereby incorporated by reference in its entirety.

BACKGROUND

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

Work vehicles, such as agricultural tractors, are used to tow a variety of equipment (e.g., planters, seeders, tillage implements) through a field. These work vehicles include suspension systems that dampen vibrations caused by uneven surfaces over which the work vehicle travels. By damping the vibrations, the suspension system may enhance the ride quality and reduce wear on work vehicle components. Unfortunately, suspension systems may change the position of the wheel relative to the ground as the work vehicle travels over uneven surfaces. This may reduce uniform contact between the tires and the ground as well as affect handling and steering of the work vehicle.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one example, a work vehicle that includes a chassis. An independent linear suspension system couples to the chassis. The independent linear suspension system includes a driveshaft that couples to the chassis and to a transmission. A wheel hub couples to the driveshaft and rotates a wheel in response to rotation of the driveshaft. A spindle couples to the wheel hub. A spindle carrier couples to the spindle. The spindle carrier defines a first aperture and a second aperture. A first pin extends through the first aperture. A second pin extends through the second aperture. The first pin and the second pin block rotation of the spindle carrier. The spindle carrier moves linearly along the first pin and the second pin.

In another example, an independent linear suspension system that includes a spindle that couples to a wheel hub. A spindle carrier that couples to the spindle. The spindle carrier defines a first aperture and a second aperture. A first pin extends through the first aperture. A second pin extends through the second aperture. The first pin and the second pin block rotation of the spindle carrier. The spindle carrier moves linearly along the first pin and the second pin.

In another example, an independent linear suspension system that includes a spindle carrier. The spindle carrier includes a first spindle carrier arm defining a first aperture that receives a first pin. The spindle carrier includes a second spindle carrier arm that defines a second aperture that receives a second pin. The first spindle carrier arm and the second spindle carrier arm block rotation of the spindle carrier. The spindle carrier moves linearly over the first pin and the second pin.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
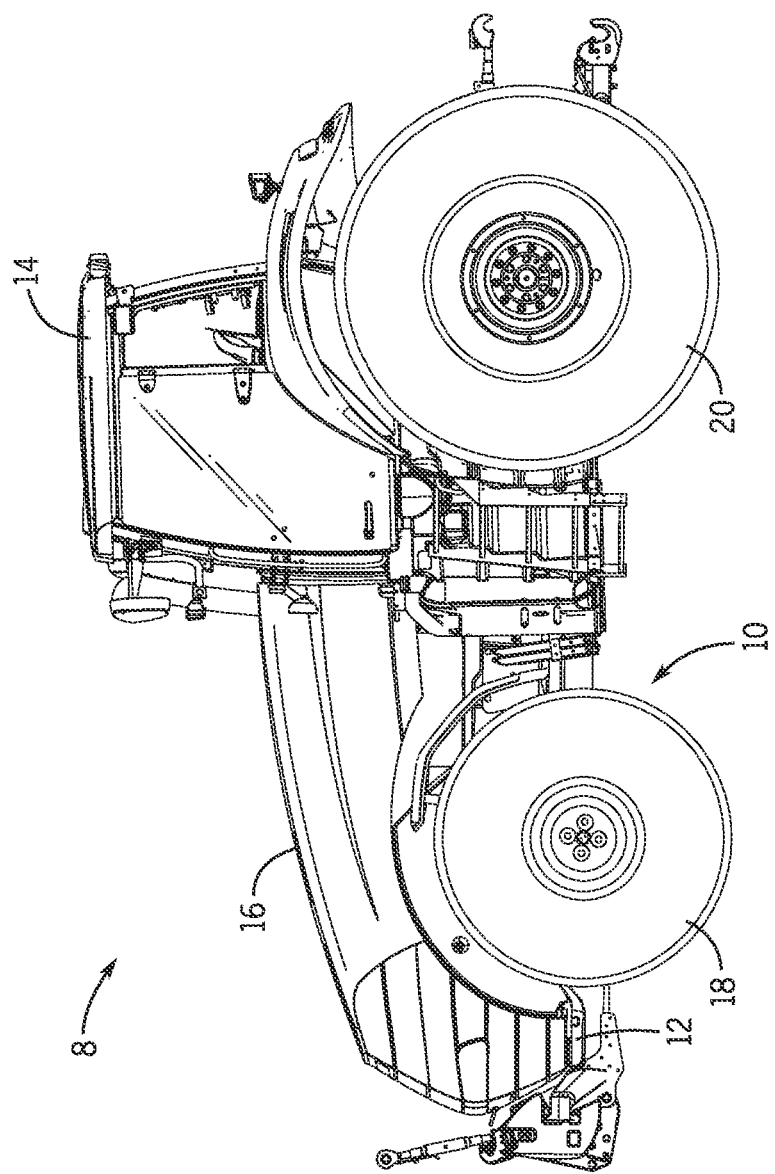
FIG. 1 is a side view of an exemplary work vehicle that may include an independent linear suspension system, according to embodiments of the present disclosure.

Certain embodiments commensurate in scope with the present disclosure are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

As used herein, the term "coupled" or "coupled to" may indicate establishing either a direct or indirect connection, and is not limited to either unless expressly referenced as such. The term "set" may refer to one or more items. Wherever possible, like or identical reference numerals are used in the figures to identify common or the same elements. The figures are not necessarily to scale and certain features and certain views of the figures may be shown exaggerated in scale for purposes of clarification.

Furthermore, when introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase A "or" B is intended to mean A, B, or both A and B.

FIG. 1 is a side view of an exemplary work vehicle 8 that may include an independent linear suspension system 10. The work vehicle 8 includes a chassis 12 (e.g., frame) configured to support a cab 14, a hood 16, front wheels 18, rear wheels 20, and various other components of the work vehicle 8. The cab 14 provides an enclosed space for an operator, and the hood 16 houses the engine and/or other systems configured to facilitate operation of the work vehicle 8 (e.g., hydraulic systems, pneumatic systems, electrical systems, mechanical systems, etc.). The wheels 18 and 20 are driven by the engine, thereby facilitating movement of the work vehicle 8 across a field, along a road, etc.

The front wheels 18 and/or the rear wheels 20 are coupled to the independent linear suspension system 10 which enables relative motion between the wheels 18, 20 and the chassis 12. For example, the independent linear suspension system 10 may include a respective axle or driveshaft that couples to a first wheel 18 on a first side of the work vehicle 8 and a second wheel 18 on a second side of the work vehicle 8. The independent linear suspension system 10 also includes a steering assembly configured to rotate each wheel 18 relative to the axle about a substantially vertical axis. In addition, the independent linear suspension system 10 includes damping cylinders that dampen movement of the wheels 18 and/or 20 as they transition between lowered and raised positions. More specifically, the damping cylinders are configured to enable movement of the axle or driveshaft with respect to the chassis 12 over a range of suspension travel. The damping cylinders thereby improve ride quality, and reduce wear on work vehicle components as the work vehicle 8 traverses an uneven surface (e.g., field).

Figure 2:
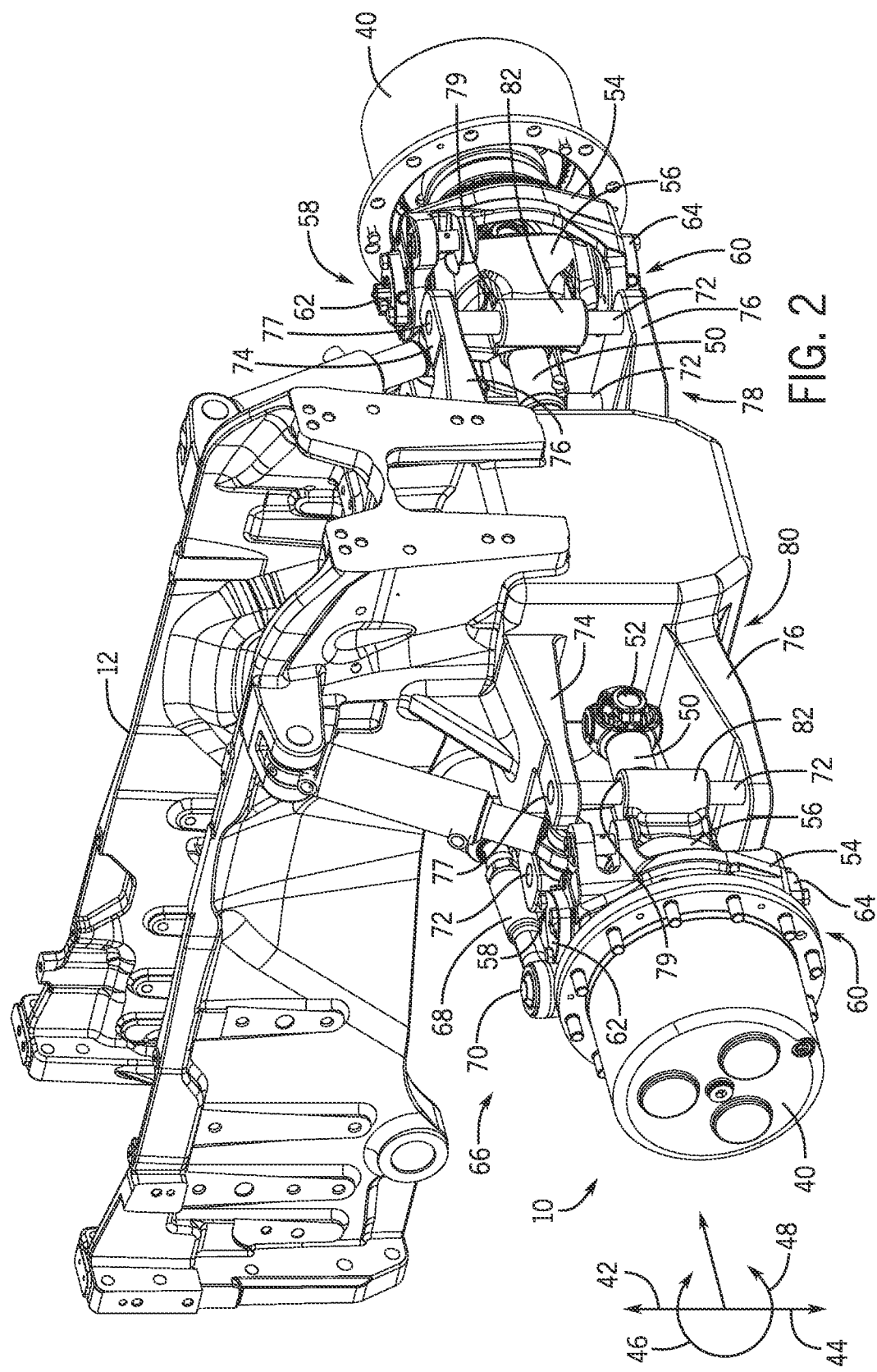
FIG. 2 is a perspective view of an embodiment of an independent linear suspension system that may be employed within the work vehicle of FIG. 1, according to embodiments of the present disclosure.

FIG. 2 is a perspective view of an embodiment of the independent linear suspension system 10 used by the work vehicle 8 of FIG. 1. As will be explained below, the independent linear suspension system 10 enables the wheel hub 40 to move vertically in directions 42 and 44 relative to the chassis 12 (axis 45 is perpendicular to directions 42 and 44). More specifically, the independent linear suspension system 10 enables wheels (e.g., wheels 18, 20) to move vertically without rotating (e.g., yaw rotation) through an arc in directions 46 and 48.

In operation, the independent linear suspension system 10 enables independent motion of the wheels 18 (seen in FIG. 1). The wheels 18 are configured to couple to the wheel hubs 40, which couple to respective driveshafts 50. In operation, the wheel hubs 40 secure the wheels 18 to the driveshafts 50 enabling the drive shafts 50 to rotate the wheels 18. The driveshafts 50 in turn couple to a transmission (not shown) with joints 52 (e.g., universal joints or u-joints).

The wheel hubs 40 are supported by a spindle 54. The spindle 54 couples to a spindle carrier 56. The spindle 54 couples to the spindle carrier 56 with first pivot connector 58 and a second pivot connector 60. The first and second pivot connectors 58, 60 includes respective retention plates 62, 64 that couple (e.g., with bolts) to the spindle 54 to retain respective bearings (e.g., cylindrical bearing). The bearings in turn couple the spindle 54 to the spindle carrier 56 while also enabling the spindle 54 to rotate relative to the spindle carrier 56. The ability of the spindle 54 to rotate relative to the spindle carrier 56 enables a steering assembly 66 to rotate each wheel relative to the chassis 12. The steering assembly 66 is configured to rotate the wheels 18 through a range of motion that enables the work vehicle 8 to turn. The steering assembly 66 includes shafts or rods 68 (e.g., tie rods) that couple to the spindle 54 with a joint 70 (e.g., tie joint, knuckle). In operation, input from a steering mechanism (e.g., steering wheel) is transferred through the rods 68 to the joint 70, which rotates the spindle 54 relative to the spindle carrier 56. Rotation of the spindle 54 then rotates the wheel hubs 40 and thus rotates the wheels 18.

As illustrated, the spindle carrier 56 couples to the chassis 12 with pins 72. The pins 72 couple to and are supported by first and second chassis arms 74 and 76. For example, the pins 72 may rest within apertures 77 defined by the first and second chassis arms 74 and 76. The first and second chassis arms 74 and 76 are separated from each other by a gap 78. The gap 78 accommodates the driveshaft 50, the spindle carrier 56, and may define the amount of vertical movement possible by the independent linear suspension system 10. The spindle carrier 56 moves within the gap 78 by sliding along the pins 72. The pins 72 couple to the spindle carrier 56 by extending through apertures 79 in the spindle carrier 56. When coupled together the pins 72 and the spindle carrier 56 form a sliding joint 80 with the apertures 79 enabling the spindle carrier 56 to slide vertically up and down in directions 42 and 44. In some embodiments, the apertures 79 may be located in arms 82 of the spindle carrier 56. In this way, the sliding joint 80 blocks rotational movement of the spindle carrier 56 in directions 46 and 48 so that the wheels 18 move vertically during operation of the independent linear suspension system 10. By directing the spindle carrier 56 vertically while simultaneously blocking rotation, the independent linear suspension system 10 may enable uniform contact between the wheels 18 and the ground, use less complicated joints and bearings, enable better handling, and enable better steering.

Figure 3:
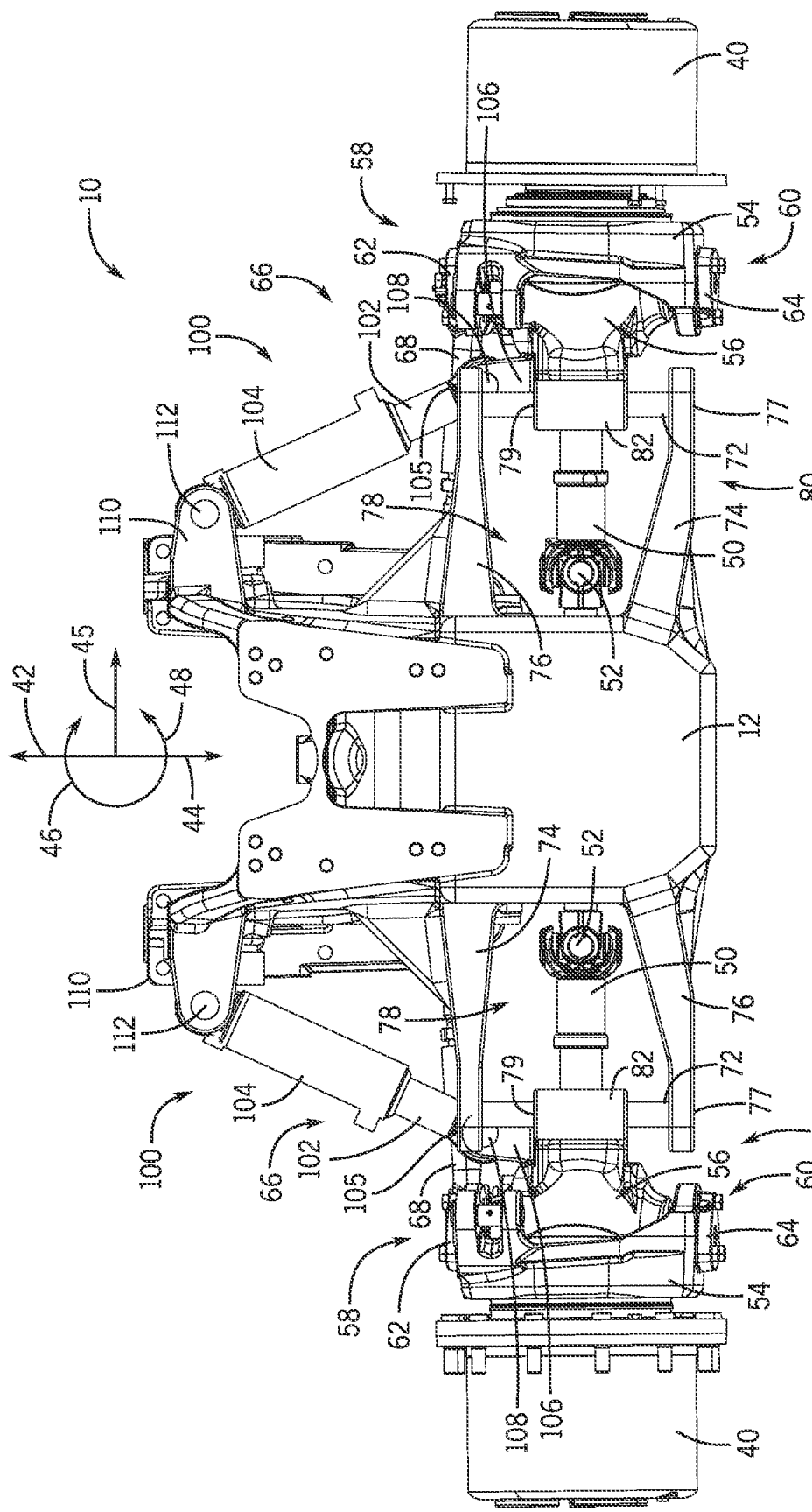
FIG. 3 is a front view of an embodiment of an independent linear suspension system that may be employed within the work vehicle of FIG. 1, according to embodiments of the present disclosure.

FIG. 3 is a front view of an embodiment of the independent linear suspension system 10 of FIG. 2. As explained above, the independent linear suspension system 10 enables the wheel hubs 40, and therefore wheels 18, to move independently of each other as well as vertically in directions 42 and 44 as the work vehicle 8 traverses uneven terrain. The independent linear suspension system 10 enables this vertical movement by forming the sliding joint 80 between the spindle carrier 56 and the pins 72. More specifically, the pins 72 control the direction of movement of the spindle carriers 56 and therefore direct the motion of the spindle carriers 56 vertically in directions 42 and 44.

The independent linear suspension system 10 also damps vertical and oscillatory movement of the spindle carrier 56, thereby enhancing ride quality and reducing wear on certain work vehicle components. In order to dampen the vertical motion of the spindle carrier 56, the independent linear suspension system 10 includes dampers 100 (e.g., damping cylinders). The dampers 100 include a piston 102 and a cylinder 104. In operation, a fluid (e.g., oil, air) within the cylinders 104 slows or reduces rapid movement of the pistons 102 as they move in and out of the cylinders 104. In this way, the dampers 100 damp vertical movement of the spindle carrier 56 and therefore the chassis 12 of the work vehicle 8 as it traverses an uneven field, thereby improving ride quality, and reducing wear on certain work vehicle components. As illustrated, the dampers 100 couple to the spindle carriers 56 and the chassis 12 with a connecting portion 105. In some embodiments, the spindle carrier 56 may include a plurality of flanges 106 that couple to the piston 102 with a pin 108. The cylinder 104 may similarly couple to the chassis 12. For example, the chassis 12 may include a plurality of flanges 110 that enable the chassis 12 to couple to the cylinders 104 with pins 112. It should be understood that the orientation of the dampers 100 may be reversed with the cylinder 104 coupling to the spindle carrier 56 and the piston 102 coupling to the chassis 12.

Figure 4:
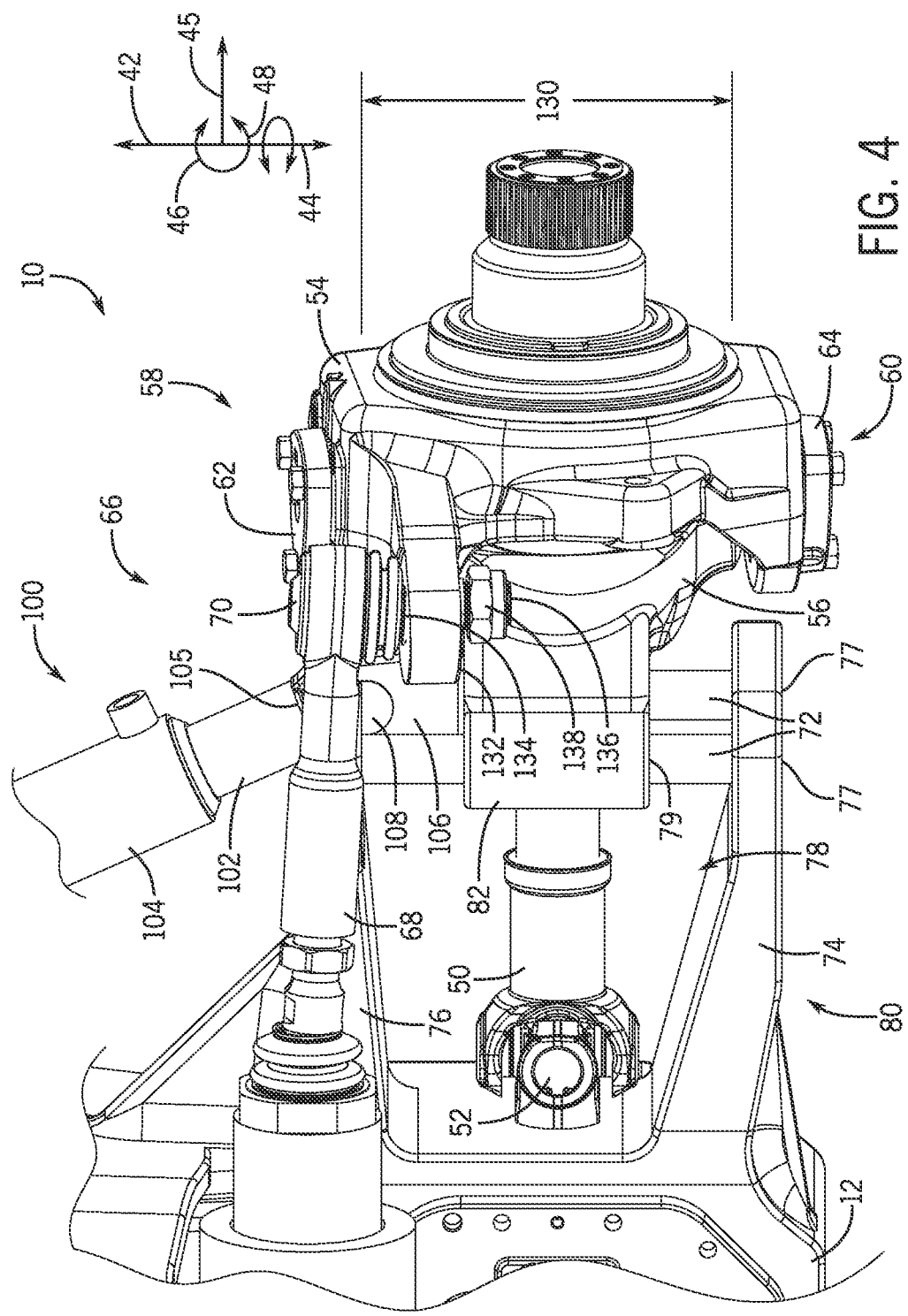
FIG. 4 is a partial perspective rear view of an embodiment of an independent linear suspension system that may be employed within the work vehicle of FIG. 1, according to embodiments of the present disclosure.

FIG. 4 is a perspective rear view of an embodiment of the independent linear suspension system 10. As explained above, the independent linear suspension system 10 enables the wheel hub 40 (seen in FIGS. 2 and 3) to move vertically in directions 42 and 44 relative to the chassis 12 (axis 45 is perpendicular to directions 42 and 44). More specifically, the independent linear suspension system 10 enables wheels (e.g., wheels 18, 20) to move vertically without rotating (e.g., yaw rotation) through an arc in directions 46 and 48.

As illustrated, the spindle carrier 56 couples to the chassis 12 with pins 72. The pins 72 couple to and are supported by the first and second chassis arms 74 and 76. For example, the pins 72 may rest within the apertures 77 defined by the first and second chassis arms 74 and 76. The first and second chassis arms 74 and 76 are separated from each other by a gap 78. The gap 78 accommodates the driveshaft 50, the spindle carrier 56, and may define a distance 130 through which the spindle carrier 56 may travel. In other words, the distance 130 may be the distance that the independent linear suspension system 10 may travel. The spindle carrier 56 moves within the gap 78 by sliding along the pins 72. The pins 72 couple to the spindle carrier 56 forming the sliding joint 80. The sliding joint 80 blocks rotational movement of the spindle carrier 56 in directions 46 and 48 so that the wheels 18 move vertically during operation of the independent linear suspension system 10. The independent linear suspension system 10 may therefore enable uniform contact between the wheels 18 and the ground, use less complicated joints and bearings, enable better handling, and enable better steering.

As explained above, the spindle 54 couples to the spindle carrier 56 with the first pivot connector 58 and the second pivot connector 60. The first and second pivot connectors 58, 60 includes respective retention plates 62, 64 that couple (e.g., with bolts) to the spindle 54 to retain respective bearings (e.g., cylindrical bearing) between the spindle 54 and the spindle carrier 56. These bearings enable the spindle 54 to rotate relative to the spindle carrier 56. The ability of the spindle 54 to rotate relative to the spindle carrier 56 enables a steering assembly 66 to rotate the wheels 18 relative to the chassis 12. The steering assembly 66 is configured to rotate the wheels 18 through a range of motion that enables the work vehicle 8 to turn. The steering assembly 66 includes shafts or rods 68 (e.g., tie rods) that couple to the spindle 54 with a joint 70 (e.g., tie joint, knuckle). In operation, input from a steering mechanism is transferred through the rods 68 to the joint 70, which rotates the spindle 54 relative to the spindle carrier 56. Rotation of the spindle 54 rotates the wheel hubs 40, which rotates the wheels 18. In some embodiments, the spindle 54 may include a flange 132 that defines an aperture 134 that enables the joint 70 to couple to the spindle 54. For example, the joint 70 may include a bolt 136 that extends through the aperture 134 and is secured to the flange 132 with a nut 138.

Figure 5:
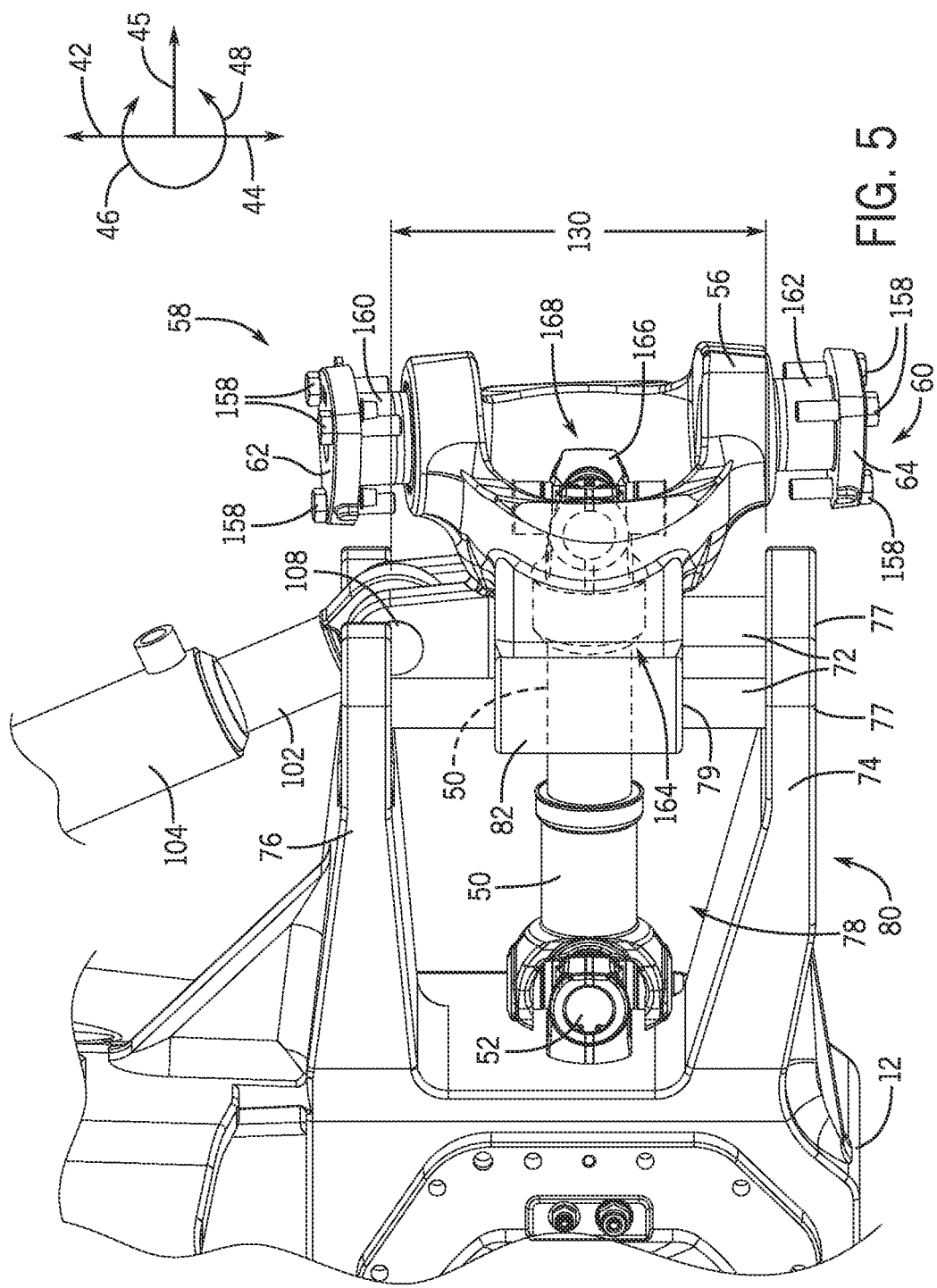
FIG. 5 is a partial perspective rear view of an embodiment of an independent linear suspension system that may be employed within the work vehicle of FIG. 1, according to embodiments of the present disclosure.

FIG. 5 is a perspective rear view of an embodiment of the independent linear suspension system 10. As illustrated, the spindle carrier 56 couples to the chassis 12 with pins 72. The pins 72 couple to and are supported by the first and second chassis arms 74 and 76. The first and second chassis arms 74 and 76 are separated from each other by the gap 78. The gap 78 accommodates the driveshaft 50, the spindle carrier 56, and may define the distance 130 through which the spindle carrier 56 may travel. The spindle carrier 56 moves within the gap 78 by sliding along the pins 72. The pins 72 couple to the arms 82 of the spindle carrier 56 forming the sliding joint 80. The sliding joint 80 blocks rotational movement of the spindle carrier 56 in directions 46 and 48 enabling the wheels 18 to move vertically (e.g., only vertically, or along a single axis) during operation of the independent linear suspension system 10. The independent linear suspension system 10 may therefore enable uniform contact between the wheels 18 and the ground, use less complicated joints and bearings, enable better handling, and enable better steering.

As explained above, the spindle 54 couples to the spindle carrier 56 (seen in FIGS. 2-4) with the first pivot connector 58 and the second pivot connector 60. The first and second pivot connectors 58, 60 includes respective retention plates 62, 64 that couple with bolts 158 to the spindle 54 to retain respective bearings 160, 162 (e.g., cylindrical bearing) between the spindle 54 and the spindle carrier 56. These bearings 160, 162 enable the spindle 54 to rotate relative to the spindle carrier 56. The ability of the spindle 54 to rotate relative to the spindle carrier 56 enables the steering assembly 66 to rotate the wheels 18 relative to the chassis 12. The steering assembly 66 is configured to rotate the wheels 18 through a range of motion that enables the work vehicle 8 to turn.

In order to transfer power from the driveshaft 50 to the wheel hub 40 (seen in FIGS. 2 and 3), the spindle carrier 56 defines an aperture 164. The driveshaft 50 extends through this aperture 164 and accommodates a joint 166 that enables the wheel hub 40 to couple to the driveshaft 50. In addition to transferring power, the joint 166 enables the spindle 54 and the wheel hub 40 to rotate relative to the spindle carrier 56 in response to input from the steering assembly 66. Together, the spindle carrier 56 and spindle 54 form a housing that contains the joint 166.

Figure 6:
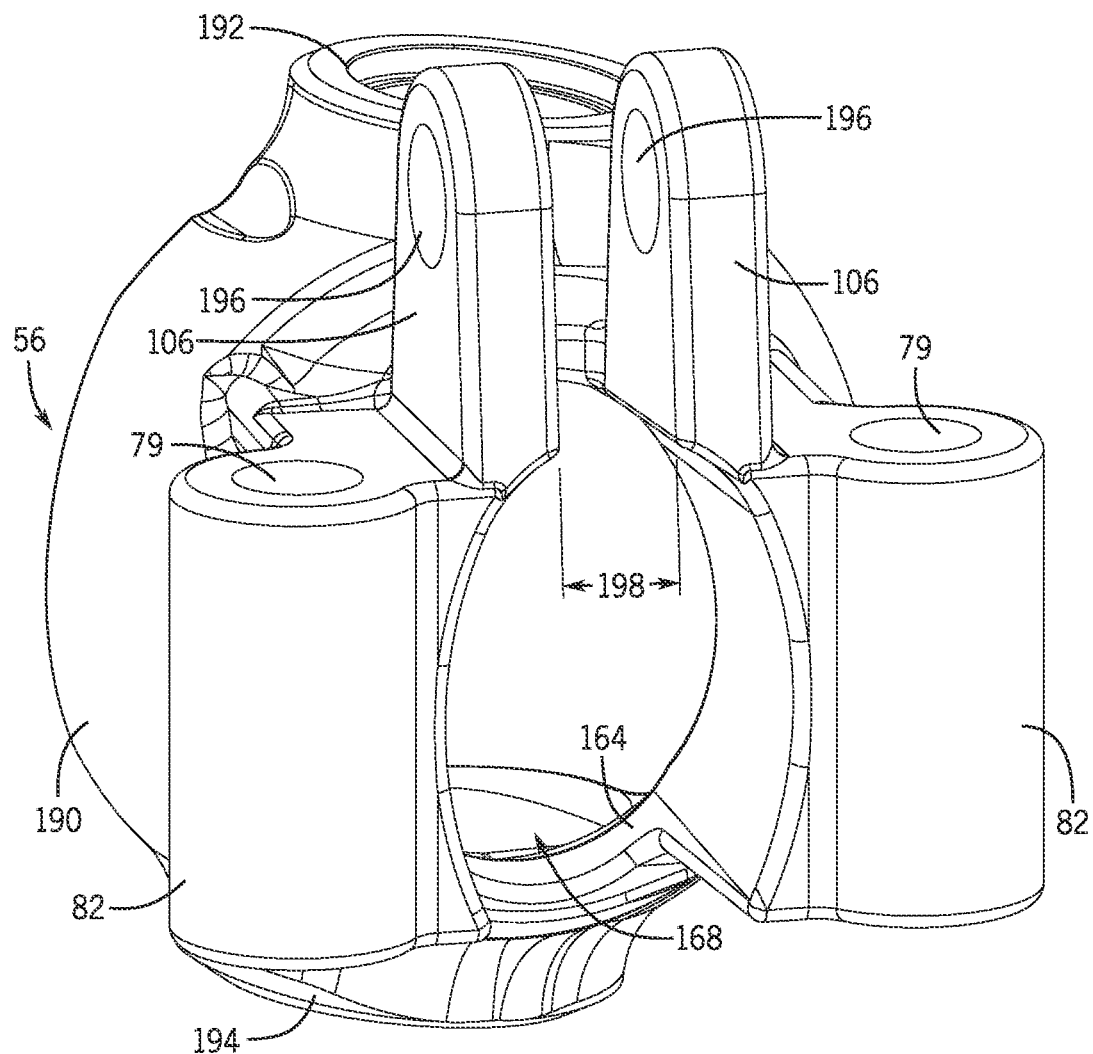
FIG. 6 is a perspective view of an embodiment of a spindle carrier of an independent linear suspension system that may be employed within the work vehicle of FIG. 1, according to embodiments of the present disclosure.

FIG. 6 is a perspective view of an embodiment of the spindle carrier 56. The spindle carrier 56 includes a body 190 that defines the cavity 168 and the aperture 164 in communication with the cavity 168. As explained above, the spindle carrier 56 couples to the spindle 54 with the first pivot connector 58 and the second pivot connector 60. More specifically, the spindle carrier 56 and the spindle 54 couple together with bearings 160 and 162. The spindle carrier 56 receives these bearings 160, 162 in respective grooves or recesses 192, 194 formed in the body 190. To couple to the pins 72, the spindle carrier 56 may include the arms 82 that define the apertures 79. Together the pins 72 and the arms 82 form the sliding joint 80 that enables the spindle carrier 56 to move vertically. In some embodiments, the flanges 106 may couple to and/or extend from the arms 82. The flanges 106 define respective apertures 196 that are aligned with and offset from each other by a distance 198. The distance 198 enables a portion of the piston 102 or cylinder 104 (e.g., connecting portion 105) to be placed between the flanges 106, which is then coupled to the flanges 106 with the pin 108.

As used herein, the terms "inner" and "outer"; "up" and "down"; "upper" and "lower"; "upward" and "downward"; "above" and "below"; "inward" and "outward"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

The foregoing description, for purpose of explanation, has been described with reference to specific embodiments.

However, the illustrative discussions above are not intended to be exhaustive or to limit the disclosure to the precise forms disclosed. Many modifications and variations are possible in view of the above teachings. Moreover, the order in which the elements of the methods described herein are illustrated and described may be re-arranged, and/or two or more elements may occur simultaneously. The embodiments were chosen and described in order to best explain the principals of the disclosure and its practical applications, to thereby enable others skilled in the art to best utilize the disclosure and various embodiments with various modifications as are suited to the particular use contemplated.

Finally, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A work vehicle, comprising:
a chassis; and
an independent linear suspension system configured to couple to the chassis, the independent linear suspension system comprises:
a driveshaft;
a wheel hub coupled to the driveshaft and configured to rotate a wheel in response to rotation of the driveshaft;
a spindle configured to couple to the wheel hub;
a spindle carrier configured to couple to the spindle, the spindle carrier defining a first aperture and a second aperture, wherein the spindle carrier couples to the spindle via a pivot connector, the spindle is configured to rotate relative to the spindle carrier via the pivot connector, the pivot connector comprises a plate and a bearing, the bearing is configured to couple to the spindle and the spindle carrier, and the plate is configured to non-rotatably couple to the spindle to block separation of the bearing from the spindle and the spindle carrier;
a first pin configured to extend through the first aperture; and
a second pin configured to extend through the second aperture, wherein the first pin and the second pin block rotation of the spindle carrier, and the spindle carrier is configured to move linearly along the first pin and the second pin.

2. The work vehicle of claim 1, wherein the chassis comprises a first arm and a second arm separated by a gap, and the first pin and the second pin extend between the first arm and the second arm through the gap.

3. The work vehicle of claim 1, comprising a steering assembly, wherein the steering assembly is configured to couple to the spindle to rotate the spindle relative to the spindle carrier.

4. The work vehicle of claim 1, wherein the spindle carrier defines a third aperture that receives the driveshaft.

5. The work vehicle of claim 1, wherein the spindle carrier defines a cavity, and the cavity is configured to receive a joint that couples to the driveshaft.

6. The work vehicle of claim 1, wherein the spindle carrier comprises a first spindle carrier arm and a second spindle carrier arm, the first spindle carrier arm defines the first aperture, and the second spindle carrier arm defines the second aperture.

7. The work vehicle of claim 1, wherein the spindle carrier comprises a flange, wherein the flange comprises a first flange arm and a second flange arm separated by a gap, a connecting portion of a damper is configured to be disposed within the gap, and the flange is configured to couple to the damper.

8. The work vehicle of claim 7, comprising:
the damper configured to couple to the spindle carrier and to dampen movement of the spindle carrier; and
a pin configured to extend through an opening in the first flange arm, an opening in the second flange arm, and an opening in the connecting portion of the damper to couple the damper to the flange.

9. An independent linear suspension system, comprising:
a damper comprising a connecting portion;
a spindle configured to couple to a wheel hub;
a spindle carrier configured to couple to the spindle, the spindle carrier defining a first aperture and a second aperture, wherein the spindle carrier couples to the spindle via a pivot connector, the spindle is configured to rotate relative to the spindle carrier via the pivot connector, the pivot connector comprises a plate and a bearing, the bearing is configured to couple to the spindle and the spindle carrier, and the plate is configured to non-rotatably couple to the spindle to block separation of the bearing from the spindle and the spindle carrier;
a first pin configured to extend through the first aperture; and
a second pin configured to extend through the second aperture, wherein the first pin and the second pin block rotation of the spindle carrier, and the spindle carrier is configured to move linearly along the first pin and the second pin.

10. The system of claim 9, wherein the first pin and the second pin are configured to couple to a chassis of a work vehicle.

11. The system of claim 9, wherein the spindle couples to the spindle carrier with a pivot connector, and the spindle is configured to rotate relative to the spindle carrier via the pivot connector.

12. The system of claim 9, wherein the spindle carrier comprises a first spindle carrier arm and a second spindle carrier arm, the first spindle carrier arm defines the first aperture, and the second spindle carrier arm defines the second aperture.

13. The system of claim 9, wherein the spindle carrier comprises a flange, and the flange is configured to couple to a damper that dampens movement of the independent linear suspension system.

14. An independent linear suspension system, comprising:
a spindle carrier, wherein the spindle carrier couples to a spindle via a pivot connector, the spindle is configured to rotate relative to the spindle carrier via the pivot connector, the pivot connector comprises a plate and a bearing, the bearing is configured to couple to the spindle and the spindle carrier, and the plate is configured to non-rotatably couple to the spindle to block separation of the bearing from the spindle and the spindle carrier, wherein the spindle carrier comprises:
a first spindle carrier arm defining a first aperture configured to receive a first pin; and a second spindle carrier arm defining a second aperture configured to receive a second pin, wherein the first spindle carrier arm and the second spindle carrier arm are configured to block rotation of the spindle carrier, and the spindle carrier is configured to move linearly over the first pin and the second pin.

15. The system of claim 14, wherein the spindle carrier defines a third aperture configured to receive a driveshaft.

16. The system of claim 14, wherein the spindle carrier defines a cavity, and the cavity is configured to receive a joint that couples to a driveshaft.

17. The system of claim 14, wherein the spindle carrier comprises a flange, and the flange is configured to couple to a damper.

18. The system of claim 14, wherein the spindle carrier comprises a recess configured to receive a pivot connector that couples the spindle carrier to a spindle.

* * * * *